(12) United States Patent
McBeath

(10) Patent No.: US 7,961,637 B2
(45) Date of Patent: Jun. 14, 2011

(54) METHOD AND APPARATUS FOR MONITORING LATENCY, JITTER, PACKET THROUGHPUT AND PACKET LOSS RATIO BETWEEN TWO POINTS ON A NETWORK

(75) Inventor: Tom McBeath, Simi Valley, CA (US)

(73) Assignee: Spirent Communications of Rockville, Inc., Rockville, MD (US)

( * ) Notice: Subject to any disclaimer, the term of this patent is extended or adjusted under 35 U.S.C. 154(b) by 1198 days.

(21) Appl. No.: 10/862,959

(22) Filed: Jun. 7, 2004

(65) Prior Publication Data
US 2005/0270982 A1    Dec. 8, 2005

(51) Int. Cl.
*H04L 1/00* (2006.01)
(52) U.S. Cl. ........................................................ 370/252
(58) Field of Classification Search .................... 370/252
See application file for complete search history.

(56) References Cited

U.S. PATENT DOCUMENTS

| | | |
|---|---|---|
| 5,521,907 A | 5/1996 | Ennis, Jr. et al. |
| 5,793,753 A | 8/1998 | Hershey et al. |
| 6,112,236 A | 8/2000 | Dollin et al. |
| 6,738,349 B1 | 5/2004 | Cen |
| 6,928,473 B1 * | 8/2005 | Sundaram et al. ............. 709/224 |
| 7,170,856 B1 * | 1/2007 | Ho et al. ......................... 370/230 |
| 2003/0161321 A1 * | 8/2003 | Karam et al. ............. 370/395.21 |
| 2004/0044761 A1 * | 3/2004 | Phillipi et al. ................ 709/223 |
| 2005/0270982 A1 * | 12/2005 | McBeath ...................... 370/252 |

OTHER PUBLICATIONS

Over C. Perkins etc. IETF RFC 3158 "RTP Testing Strategies", Aug. 2001.*
Schulzrinne, et al, RFC 1889 "RTP: A Transport Protocol for Real-Time Applications", Jan. 1996.*

* cited by examiner

*Primary Examiner* — Jianye Wu
(74) *Attorney, Agent, or Firm* — Haynes Beffel & Wolfeld LLP; Ernest J. Beffel, Jr.

(57) ABSTRACT

A system for testing a segment of a data-packet-network has a first probe connected substantially at one end of the segment; a second probe connected substantially at the opposite end of the segment from the location of the first probe; and a process application distributed to each probe. The first and second probes collect data from and time stamp data packets as they pass forming first and second records of the individual packets whereupon the second-formed records of each packet are compared with the first records of each packet for record matching, time-stamp comparison and test result processing.

29 Claims, 4 Drawing Sheets

METHOD AND APPARATUS FOR MONITORING LATENCY, JITTER, PACKET THROUGHPUT AND PACKET LOSS RATIO BETWEEN TWO POINTS ON A NETWORK

FIELD OF THE INVENTION

The present invention is in the field of data-packet-network (DPN) performance testing and pertains particularly to a method and apparatus for passive measurement of packet latency from one point to another point and subsequent calculation of packet loss ratio for a network line or segment.

BACKGROUND OF THE INVENTION

In the field of performance testing for data-packet-networks (DPNs), administrators attempt to gauge performance characteristics of various network segments and lines in real time in order to better manage network traffic. In most applications there are four basic measurements whose results provide various pieces of information regarding some aspect of performance. These four basic measurements are:

Latency-defined as the average time it takes a data packet to travel from one point on a DPN to another point on the DPN.

Jitter-defined as variation in latency measured between two endpoints on a DPN over a given time frame.

Packet Loss-defined as a percentage of data packets that become lost between two points of a DPN.

Throughput-defined as a maximum value of number of bits per second that are transmitted between two points on a DPN segment in both directions.

The above-described values can change or evolve over time for any specific line or segment of a network that is used as a routing path between two test points. Therefore, testing is routinely performed on a periodic or, in some instances, on an ongoing basis.

In prior art, performance measurement of a DPN segment is traditionally practiced by injecting data signal packets onto the segment from a node configured as an end node at one end of the segment to be tested. The destination of the injected signal packet is another node at the other end of the segment to be measured. Each test signal is provided a time stamp before send and each signal is captured at the other end node. Latency for each send/receive is calculated for each signal packet at the target-receiving node on the segment by comparing the timestamp provided to the signal packet with the current time the packet was received and logging the time difference for each packet received. In this case, the receiving node must carry the same time reference clock as the sending node, or at least, know by reference the receiving nodes time zone. Latency for data sent in one direction from one sending node to one receiving node on the segment can be calculated by averaging the time differences noted over multiple instances of the signal packet sent and received.

Latency is more accurately measured in one direction. Either direction of the bi-directional segment may be tested with the receiving node performing the calculations for a particular test flow. Another less accurate method involves sending a time-stamped echo packet and then waiting for a response acknowledgement from a target node. To derive the average latency for each direction for a particular transaction, the sending node, after receiving the response packet derives the total time from the time stamp and the current time and divides the time delay by two to give average bi-directional latency.

Jitter is typically derived from ongoing latency calculations as defined above. The number of packets actually received at the target node over a specified period of time is compared with the number of actual packet transmissions from the sending node to derive packet loss ratio. Data throughput is derived from the latency values in both directions.

A drawback to the above-described technique is that data must be injected into the segment bandwidth that is used by the public, possibly reducing available bandwidth that individuals communicating over the segment being tested share. Moreover, testing for latency in one direction requires both end nodes to correctly reference the local time of the sending node for comparing time stamp data.

Another problem may occur over network segments that are enhanced for multiprotocol label switching (MPLS), an Internet Engineering Task Force (IETF) initiative that provides alternate routing paths. In this case the injected signal packets must be sent from the same subnet with reference to source and destination addresses, as are the data packets of a particular customer's data stream that we are trying to emulate. Likewise the injected packets must be serviced according to the same priority. Otherwise, the test can not be sure that it is reporting the conditions that a customer is experiencing because the signal data packets may not travel the same paths or be queued in the same router queues as the customer stream.

With the use of MPLS and other dynamic routing methods then, it is virtually impossible to predict the route of a packet through the network and any injected packet is unlikely to follow the same route in a complex load balanced network.

Therefore, what is clearly needed is a method and apparatus for testing performance of network segments that would solve the problems stated above.

SUMMARY OF THE INVENTION

A system for testing a segment of a data-packet-network is provided and includes a first probe connected substantially at one end of the segment, a second probe connected substantially at the opposite end of the segment from the location of the first probe; and a process application distributed to each probe. In a preferred embodiment, the first and second probes collect data from and time stamp data packets as they pass forming first and second records of the individual packets whereupon the second-formed records of each packet are compared with the first records of each packet for record matching, time-stamp comparison and test result processing.

In one embodiment the data-packet-network supports one or both of a transport control protocol and of a real-time transport protocol-capable network. In one embodiment, the data-packet-network is the Internet network. In another embodiment the data-packet-network is an Ethernet network.

In one embodiment, the probes are one or a combination of desktop computers, network routers or network severs having permanent or temporary access to the data packet network. In another embodiment, the probes are dedicated units programmed for line testing. In still another embodiment, the probes are software components distributed to selected end nodes. In yet another embodiment, the probes are firmware components distributed to selected end nodes. In this embodiment, the firmware components include instructions for performing a testing sequence.

In a preferred embodiment, the result processing produces one, all, or a combination of, an average latency value for the segment; an average jitter value for the segment; an average packet-loss ratio value of the segment; or an average data throughput value of the segment.

In one embodiment the segment defines a network line between two end nodes. In one embodiment the segment defines an MPLS tunnel. In one embodiment, the segment defines a network line including one or more intermediary data hops.

According to another aspect of the present invention, a method for testing a segment of a data-packet-network is provided and includes steps for (a) establishing a pair of probes near the endpoints of the segment; (b) capturing data from data packets traveling the length of the segment one time at each probe of the pair of probes; (c) recording the captured data and time-stamping each record formed; (d) sharing records formed by one probe with the other probe, the records shared by either probe in the record forming sequence; (e) matching the shared records at the receiving probe to the records held at the receiving probe; (f) comparing the time-stamp information of the matching records; and (g) processing the comparison results for the aggregate of matches to produce resulting test values for the segment tested.

In a preferred aspect the data-packet-network supports one or both of transport control protocol and real-time transport protocol. In this aspect, the data-packet-network is one of an IP network or an Ethernet network.

In one aspect, in step (a) the probes are one or a combination of desktop computers, network routers, network severs having permanent or temporary access to the data packet network. In another aspect, the probes are dedicated units programmed for line testing. In another aspect, the probes are software components distributed to selected end nodes. In still another aspect, the probes are firmware components distributed to selected end nodes.

In a preferred aspect, in step (b) the data captured includes source ID, destination ID, and sequence number of each packet selected for data capture. In one aspect, in step (c) the records are stored in a data cache maintained by the recording probe. Also in one aspect, in step (d) the records are shared via a control plane link between the probes.

In preferred aspects, in step (e) the records are matched according to the unique set of source ID, destination ID and sequence number. In a preferred aspect, in step (f) a latency value is produced as a result value for each matching record having two time stamps to compare. Also in a preferred aspect, in step (g) the aggregate defines all of the records currently held in storage the results valid for the period of testing.

BRIEF DESCRIPTION OF THE DRAWING FIGURES

DESCRIPTION OF THE PREFERRED EMBODIMENTS

According to an embodiment of the present invention, the inventor provides a method and apparatus for passively testing a network segment of a DPN for performance data. The method and apparatus of the invention will be described in detail in the following embodiments.

Figure 1:
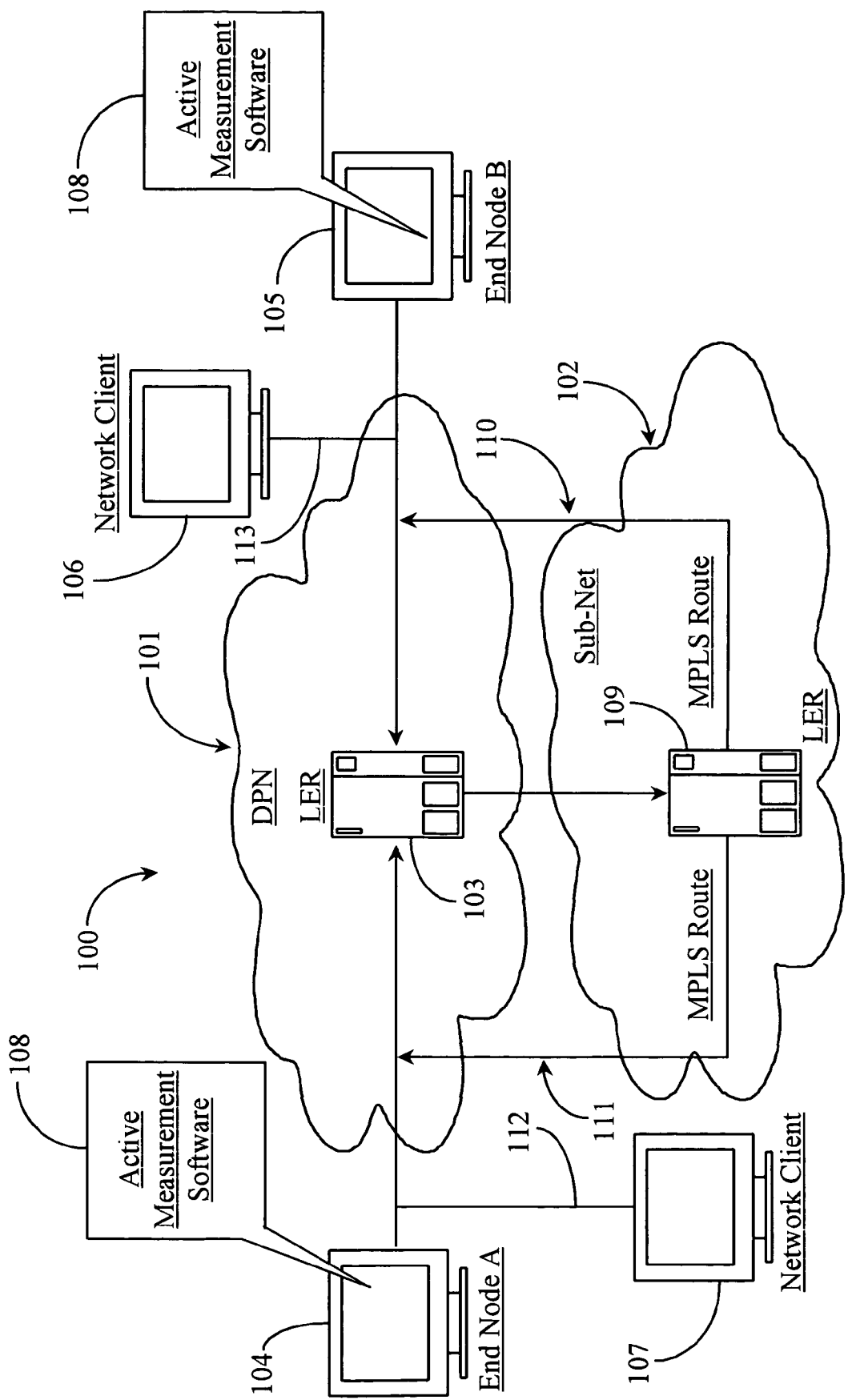
FIG. 1 is a logical architectural overview of a network segment tested for performance according to prior art.

FIG. 1 is a logical architectural overview 100 of a network segment tested for performance according to prior art. Architecture 100 includes, in this example, a data-packet-network (DPN) 101 and a sub-net 102. DPN 101 may represent a portion or segment of an Ethernet network, an IP network such as an Internet or Intranet, a private wide-area-network (WAN), or a local-area-network (LAN).

Network 101 has a segment or routing path illustrated therein that serves to connect two end nodes, an end node 104 and an end node 105, also referred to herein as end nodes A and B respectively and as labeled. End nodes A and B represent communicating nodes that may communicate with one another over the illustrated path through DPN 101. Nodes A and B may be computer nodes, server nodes, gateways, routers, or any combination of the above. In this example, they are computers connected to the network for communication.

A leading edge router (LER) 103 is illustrated in the communication path between nodes A and B. In this example, router 103 may route data packets sourced from either node A and destined for node B or sourced from node B and destined for node A over alternate data paths according to multi-protocol label switching (MPLS), which is an IETF initiated protocol for prioritizing and rerouting traffic from normal paths to alternate paths to a same destination in order to better control traffic flow.

Sub-net 102 may represent any local sub-network connected to DPN 101 through which traffic may be diverted from normal routes. Sub-net 102 is referred to as an MPLS network because it supports MPLS paths 110 and 111. For example, data packets from node A to node B may, in some cases, be re-routed from router 103 in DPN 101 to a router 109 in sub-net 102, over path 110 back into DPN 101 bypassing a certain stretch of a network line or segment that may be experiencing low performance problems. Likewise, data packets sent from node B to node A may be re-routed at router 103, to router 109 and over path 111 back into DPN 101 avoiding a certain portion of the segment.

A network client 106 and a network client 107 are illustrated in this example and shown connected to DPN 101 via network access lines 113 and 112 respectively. Clients 106 and 107 represent any user network access from a computer or any other network-capable node. Network access may be of any type known such as dial-up modem through an ISP, network card access, cable modem access, or wireless access. In this example clients, 106 and 107 are network-capable and connected computers.

End node A has an instance of active measurement software 108 installed and executable thereon. Software 108 is adapted to enable generation of test or signal data packets and injection of those packets generated onto the network segment being tested. End node B has an identical instance of software 108 installed and executable thereon. In this case, the software 108 enables testing of a network segment or path for performance characteristics such as packet latency, jitter and the like.

One problem with this prior-art example is the very presence of MPLS in the network. For example, if an administrator trying to test a segment in DPN 101 and that test seeks to measure the client experience, then the fact that client traffic may be routed through an MPLS tunnel (paths 110, 111) require that the test signals also be so routed. Otherwise the test is not measuring the true client experience because the test packets may not be traveling along the same route and they might not be queued in the same queues within router 103, which diverts traffic onto the MPLS paths.

In the absence of MPLS, any test packets injected onto DPN 101 will share bandwidth with the client traffic already traveling over the segment thereby adding to the latency and performance problem, which may be noticeable under heavy traffic conditions.

Figure 2:
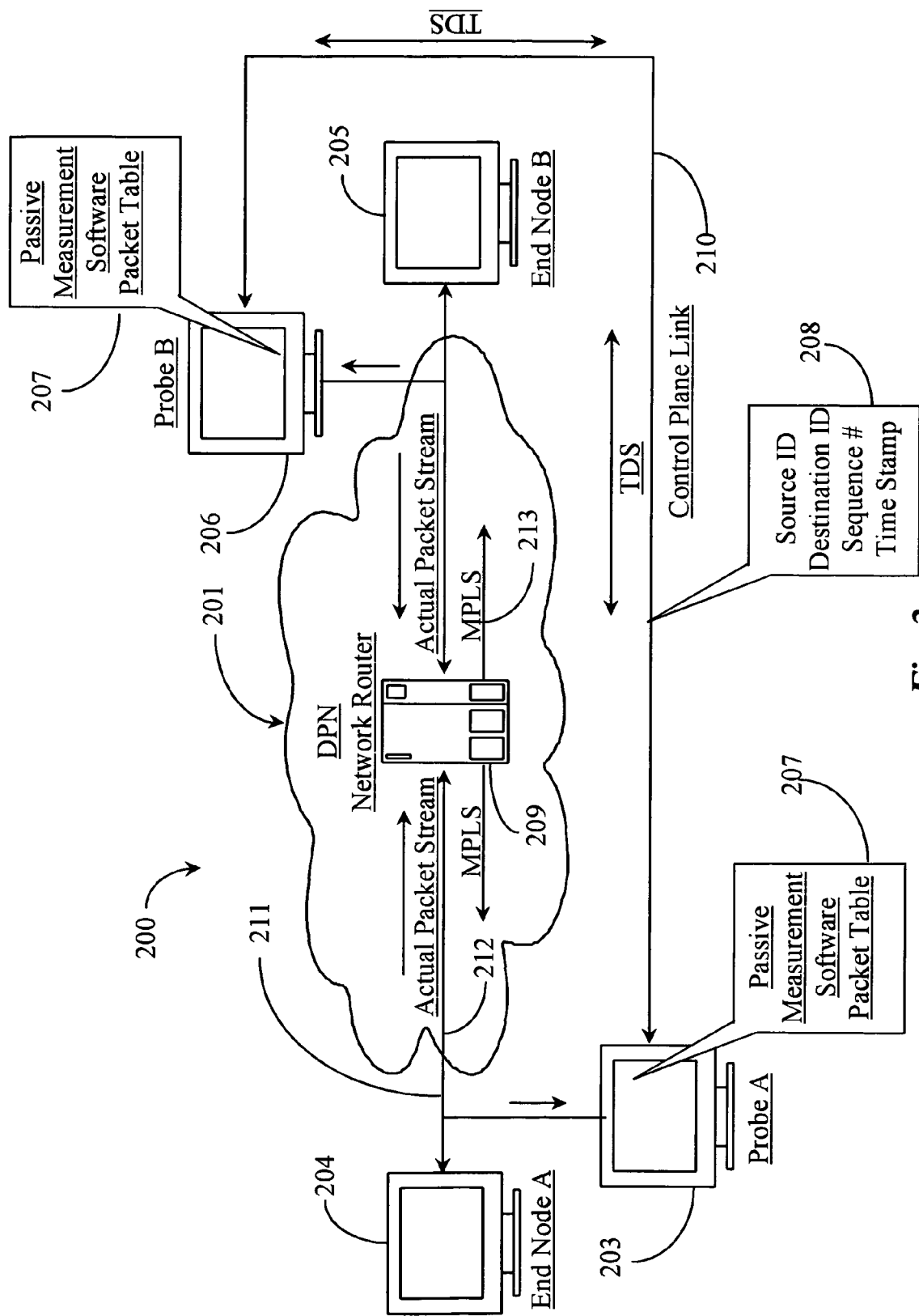
FIG. 2 is a logical architectural overview of a network segment tested for performance according to an embodiment of the present invention.

FIG. 2 is a logical architectural overview 200 of a network segment tested for performance according to an embodiment of the present invention. Network overview 200 may include a DPN 201, which may be analogous to network 101 described with reference to FIG. 1. In this example, a network router 209, which may be an LER adapted to divert MPLS traffic is illustrated and is analogous to router 103 of FIG. 1.

An end node 204 and an end node 205, also referred to herein as nodes A and B are illustrated in this embodiment as end nodes that are considered end points of a segment subject to testing for performance. End nodes A and B may be any type of nodes that are connected to and capable of generating packet streams that may be transmitted over DPN 201.

Unlike the example of FIG. 1 above, end nodes A and B do not have any testing software installed thereon and do not participate in network line or segment testing. Rather, end nodes A and B simply mark, in this case, a length of DPN 201 that will be tested. As communicating nodes connected to DPN 201, nodes A and B routinely send data packets back and forth during normal network communication with each other. Communication between nodes A and B may, in one embodiment, be normal bi-directional communication that is detected and then exploited for testing. In another embodiment, nodes A and B may be caused to communicate with each other by testing authorities in order to establish a bidirectional communication stream that may be observed or monitored during testing.

A probe 203 and a probe 206 also referred to herein as probe A and as probe B are provided within DPN 201 and are installed in the line or segment to be tested between end nodes A and B. Probe A is connected in the line or segment at a physical point close to end node A and probe B is installed at a physical point close to end node B. Probes A and B each have an instance of passive measurement software (207) installed and executable thereon. Software 207 does not perform testing by injection of test data onto DPN 201. Rather, software 207 performs testing by monitoring actual data packets that pass by during normal bidirectional communication.

Probes A and B may be provided in the form of simple dedicated units that perform no computing or communication tasks other than those required for passive monitoring of data traffic and other tasks related to a unique method for passive line testing. In another embodiment, probes A and B may be multitask computers like desktop computers, servers, routers, or other network machines that are enhanced for the functions of line or segment testing by software instances 207.

In this example, MPLS function is logically illustrated from the point of router 209 by MPLS paths 213 and 214 emanating from router 209. MPLS paths 213 and 214 may be considered analogous to MPLS paths or tunnels 110 and 111 described with reference to FIG. 1 above.

Either or both of probes A and B may initiate testing over the link or line between nodes A and B in this example. For example, probe A may intercept data packets being sent from end node A that are addressed to be received at end node B. Like wise, node B may intercept data packets sent from end node B that are addressed for receipt by end node A. Each instance of software 207 in this example includes the capability of tabling certain data parameters that are disseminated from the intercepted data packets by probes A and B.

Probes A and B may communicate with each other using a control plane link, logically illustrated herein as a separate line 210. In actual practice, a control plane link used may be layer according to the well-known OSI model the same segment being tested for latency, jitter or capacity and the like.

In practice of the present invention, one probe monitors and intercepts a data packet being sent as part of a data stream from one of the end nodes wherein the packet is destined for the opposite end node on the segment or line to be tested. For example, probe A detects a data packet stream in the line traffic that has a source IP address of node A and a destination IP address of node B. If end nodes A and B have been selected as the end-points for testing the link then probe A is pre-configured to look for data packets sourced from node A and destined for node B. In one embodiment, node A and B are caused to communicate with each other so that there will be a predetermined data stream that can be observed and tested. In another embodiment the testing sequence may be passive to the point of waiting until there is a normal communication stream or streams occurring between the nodes at which time the testing system triggers and testing sequences begin. In the latter case, the type of machines comprising the end nodes may be strategically selected based on a history of normal communication with one another.

Assuming that a packet stream from node A to node B is detected by probe A, then probe A will receive mirrored packets from the stream and aided by software instance 207, will store details of each mirrored packet and table certain data parameters for the packet that are found in the mirrored packet header. Although it is not illustrated herein, it may be assumed that probes A and B include, either by integration or by connection, standard IP switches in the path of the stream that perform the packet mirroring operations. The data retrieved from the packet includes the source IP address or source ID, the destination IP address, or destination ID, and the sequence number of the data packet. Probe A tables this data and provides a time stamp and packet count number along with the tabled data. The actual data packet is forwarded at the point of the switch to destination. The amount of time required to mirror, analyze and retrieve data from the actual packet is small enough that the data stream is not affected or delayed.

In a preferred embodiment, probe A sends a subset of the packet information to probe B over control plane link 210. Probe B monitors, at its end, and upon detecting the packet, provides a time stamp noting the time of detection of the packet and retains the same data previously retrieved by probe A. Probe B then compares the data record of the data provided by probe A. More particularly, probe B compares its record with the original record provided by probe A. At this point the time stamp information is compared to derive the length of time or latency of the packet traveling from probe A until it was detected by probe B. The time spent mirroring the packet data at either or both ends is negligible. The measurement of each the distances from the probes to their respective nodes may also be noted in computing the latency figure if it is to be measured from node to node instead of probe to probe.

Probe B will analyze and store information on a number of packets from the same data stream and will process the latency figures for all of the information received. In this way, probe B can calculate an average latency for the packets in the stream. Probe A is not required to mirror subsequent packets of a data stream. Probe A may be programmed to receive a mirrored packet for every 100 or some other pre-configured number of packets sent from node A, for example. The Count may be validated by sequence number or by assigned packet number.

The same process described above works in reverse for packets sent from node B to node A. Probes A and B are identically configured for bi-directional testing. That is to say that for streams traveling in the direction of node B from node A, node B, in a preferred embodiment, calculates the testing results. Likewise, for streams travel in the direction of node A from node B, probe A calculates the results. However, this particular configuration is not required in order to practice the present invention.

In one embodiment, the second probe receiving mirrored data from a packet may analyze and time stamp the data and forwarded back to the first probe, already storing mirrored data for the packet, for record comparison and calculation of test results. There are many possibilities.

In the latter flow embodiment described above, packets from a stream-passing probe B may not be in the same order as they were when they previously passed probe A. Therefore, filter criteria for probe B specifies which exact packet to look for so that the forwarded record exactly matches the tabled record in each case transaction. If a packet is not detected at probe B that was mirrored at probe A within a certain time frame, then probe B returns a null record or "packet lost" record.

During the same testing period Probe B is processing packets that are sourced from end node B that are destined for end node A. Therefore, as described above, the entire testing sequence works in both directions. The actual data streams involved in the bidirectional testing process may be un-related to each other. That is to say that they may be two separate data streams.

Bi-directional communication between probes A and B over control link 210 is illustrated herein by label TDS (tabled data stream) flow where records going in one direction for one actual data stream traveling over the tested segment make up half of the bidirectional flow. Calculations made at each probe with respect to each measured actual data stream include but are not limited to latency, jitter, packet loss ratio, and line capacity.

In one embodiment, the testing process is programmed to avoid any MPLS activity by ignoring data packets that are tagged for MPLS treatment. In still another embodiment, MPLS routes can be tested by focusing on the MPLS tags found in packet headers wherein those matching a same route can be stored and processed together in the data record at either probe.

In the embodiment described above, probes A and B test packet streams comprising related data packets or packets of a same data stream flowing from one end node to the other. However, it is important to note herein that this is not a requirement of the present invention. For example, it is possible to incorporate data packets from many different streams that happen to be flowing in a same direction between the two end nodes and the source and destination addresses do not have to be the same as the boundary nodes (A, B). For example, nodes A and B may be routers connected by a single link. The source and destination addresses of data packets detected on the link may not be of any machine occupying the specific link.

In one embodiment, probes A and B may sample all detected packet streams occurring on the link at any one time. In this way, probes may calculate for total data throughput sustained on the segment being tested, and a total packet loss ratio may also be averaged for the segment based on the loss ratios recorded for all of the current individual streams traveling the segment between the end nodes in both directions.

One with skill in the art will recognize that by using a control plane layer for probe-to-probe communication, no data has to be injected into the transport layer of the segment being tested. Further to the above, a segment may include any number of intermediary hops that are ported and contain queues like data routers and gateways.

Figure 3:
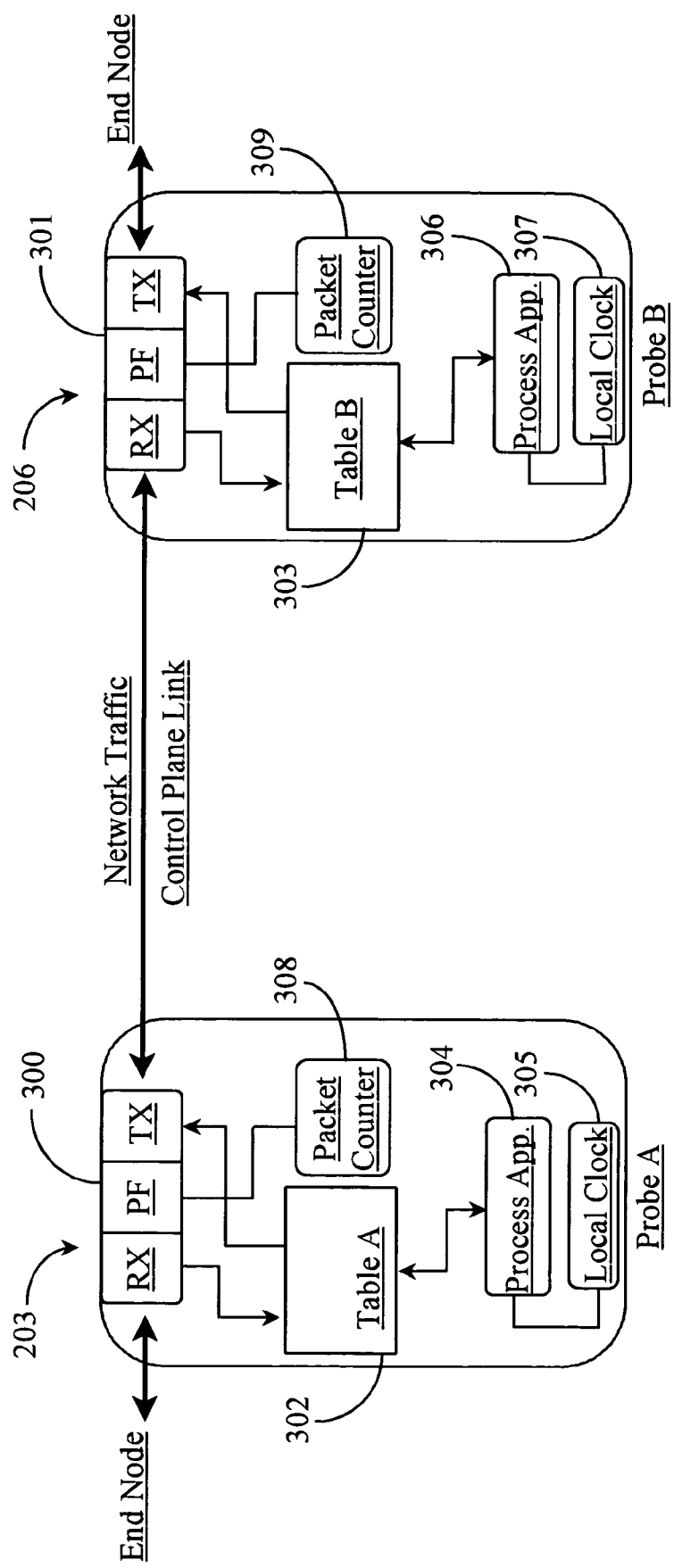
FIG. 3 is a block diagram illustrating components of a pair of passive testing probes according to an embodiment of the present invention.

FIG. 3 is a block diagram illustrating components of passive testing probes 203 and 206 of FIG. 2 according to an embodiment of the present invention. In this example, probes 203 and 206 are provided in the form of dedicated units that can be ported into DPN segment or path at any strategic location between two end nodes. In another embodiment, probes 203 and 206 may be multitask machines running the software of the present invention.

Probe A has a port structure 300 comprising at least one bi-directional communication port containing a receive capability (RX), a transmit capability (TX) and a data packet filter (PF) capability. Probe B is identically configured having port structure 301 with RX, TX and PF capabilities.

Each probe has a data table provided therein and adapted for storing packet-related data. For probe A, table 302 also referred to as table A is provided. For probe B, table 303 also referred to as table B is provided. Each probe (203, 206) is adapted with a packet counter for counting data packets. A packet counter 308 is provided to probe A while a packet counter 309 is provided to probe B. Each packet counter has association to a respective data table within its host probe.

Each probe has an instance of software and suitable hardware for processing data and making calculations to provide test results. Process application 304, analogous to software instance 207 described with reference to FIG. 2, is provided to probe A while process application 306, also analogous to software 207 of FIG. 2, is provided to probe B. Process application (304,306) may be provided as software running on a piece of hardware or it may be provided as a firmware utility. Likewise table (302, 303) has sufficient memory utility for data storage purposes. In one embodiment, a separate data storage repository may be provided for storing data processed by probes A and B. The type of memory used to store packet records may be flash memory, random access memory, or non-volatile random access memory NVRAM. Storage procedures may be similar to a large, searchable data cache storage system that may have a physical limit or a time-imposed limit on the amount of data maintained.

Each probe 203 and 206 has its own local time reference, which may be the same or which may be different with respect to differing time zones. When comparing time stamp information, each probe calculates for any time zone differences. It may be assumed that each probe has a communication stack (not illustrated) for enabling an administrator to access and communicate with each probe for maintenance and data access purposes.

In this example, probe A and probe B are connected via a network segment or line being tested. In this case the same physical wire or segment carries the network data traffic and the control data segregating the two. However, in one embodiment of the present invention there may be a separate physical link between probes A and B without departing from the spirit and scope of the present invention.

Probes A and B may be configured for any type of TCP or real-time transport protocol (RTP) enabled data packet network without departing from the spirit and scope of the present invention such as an Ethernet network for example. TCP, RTP, or any other protocol that utilizes packet sequence numbers may support passive measurement. In the case of Ethernet MAC addresses may be referenced instead of IP addresses as source destination addresses.

Figure 4:
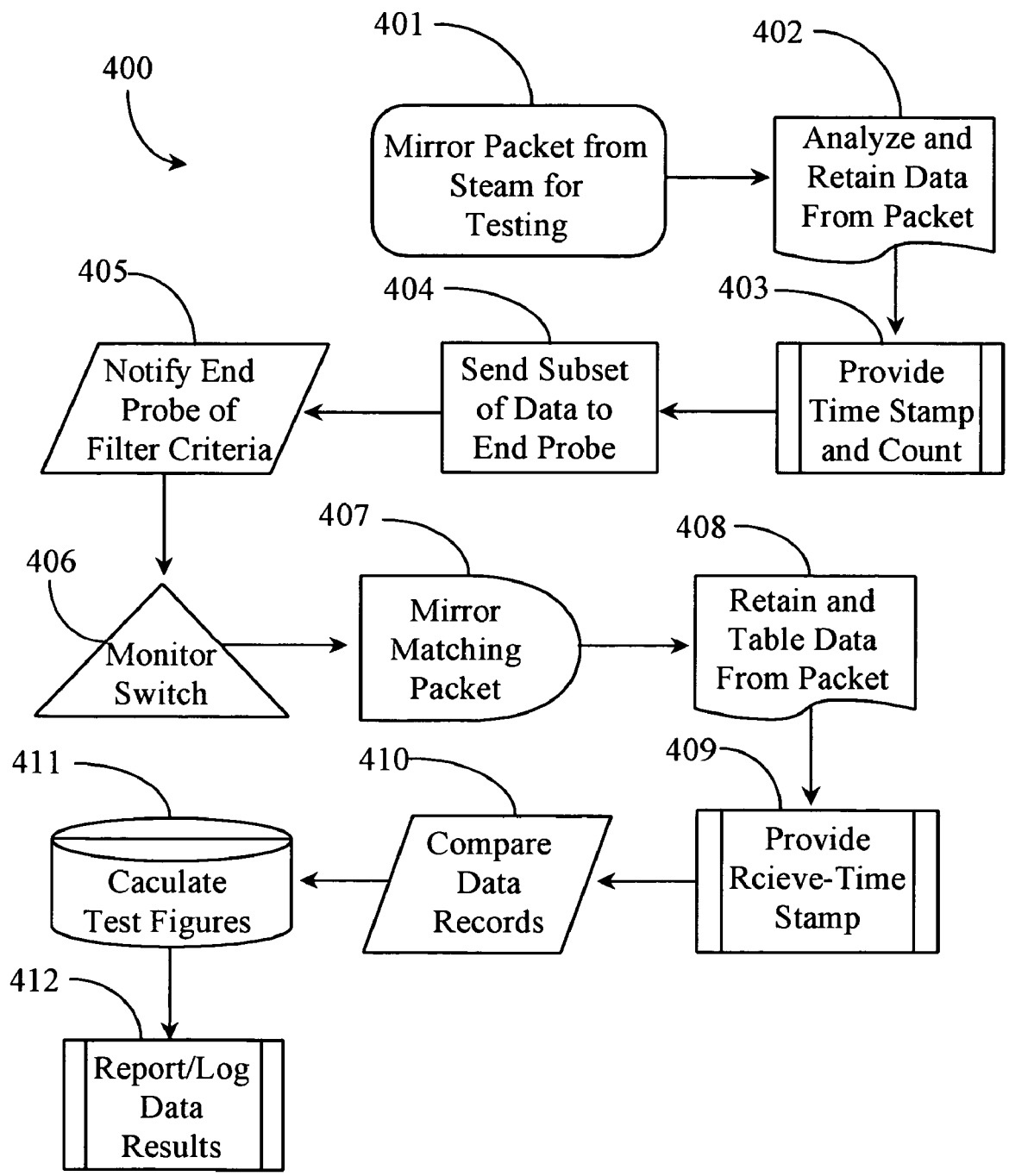
FIG. 4 is a process flow chart illustrating a process for measuring latency of a data packet according to an embodiment of the present invention.

FIG. 4 is a process flow chart 400 illustrating a process for measuring latency of a data packet according to one embodiment of the present invention. At step 401, a data packet from one node to another in a stream of packets is mirrored from a data stream as it passes a first probe. At step 402 data from the packet mirrored at step 401 is analyzed and specific data is retained by the first probe of step 401. The retained data may include a source ID, a destination ID, and a packet sequence number. If the prevailing network is an IP network then the source and destination IP addresses are retained.

At step 403, the first probe applies a time stamp and the packet is counted using a packet counter. The actual data packet subject to mirroring is not intercepted or delayed from the stream and travels on to its normal destination over the network segment. At step 404 the first probe sends a subset of packet data along with the time stamp to the second or end probe At step 405, the first probe may optionally provide the second probe, strategically located at the other end of the segment, with filter criteria that may be used to identify the packet at the switch of the second probe.

At step 406, the second probe monitors the switch (external or internal) for the passing data packet. At step 407, the second probe detects and causes the respective switch to mirror the packet matching the filter criteria to the probe. If the switch is integrated with the probe, this step may be internal. In one embodiment, the second probe mirrors all data packets traveling in the same direction from probe A and mirrors only those that match filter criteria, discarding the rest.

At step 408, packet data is again retained from the data packet. The data retained is the same data retained from the packet by the first probe. At step 409, the second probe applies a receive time stamp marking the time that the packet was mirrored at step 407. At step 410, the second probe compares the retained packet data with the record tabled therein from probe A.

At step 411, the second probe calculates test results as a result of comparing the matching data records. At step 412, the second probe reports and or logs the data results of testing.

Steps 401 through 412 are, in a preferred embodiment, repeated for multiple data packets received so as to accumulate multiple test results in the data record that can be then manipulated for calculation of average latency, jitter, packet loss ratio, and throughput of the segment that was used in transport of the packets to which the records refer.

Calculated results may be pushed in an additional step not illustrated here to an administrator operating a network connected workstation or may be stored for access by an administrator operating a network-connected workstation.

It will be recognized by one with skill in the art that the exact order and number of steps described in the process of FIG. 4 may vary slightly without departing from the spirit and scope of the present invention. For example, in one embodiment the receiving probe calculates the test results for a stream originating from its assigned local. In this case, the first probe keeps its mirrored data and only sends a short notification to the second probe to cause the second probe to identify and mirror the packet when it arrives. After the second probe timestamps the mirrored data, it sends the information to the first probe for comparison and calculation.

In one embodiment, all data packets traveling through the switch of the second probe are mirrored, counted and time-stamped. In this case, mirrored data arriving from the first probe is used to match to and retain data mirrored by the second probe. All data mirrored by the second probe that is not matched may simply be discarded. This may be a preferred embodiment where the second probe performs the testing. Likewise the process works in reverse according to bi-directionality.

In one embodiment, one or more test sequences to be performed may be pre-programmed and sent to the probes as instruction sets, which may activate at boot time of the probes. In this case, the probes may be multitask probes or dedicated probes that can receive and execute a command bitmap as part of a remote boot-up operation. In the case of existing multitask machines functioning as probes, such as routers for example, the testing sequences can be loaded during runtime.

In one embodiment of the present invention, the probes are software probes, including all of the software functionality that may be delivered to end nodes on the network whereupon those nodes may execute the testing sequences according to a machine-readable instruction set adapted to be sent as a self-executing file. In this case, the end nodes may communicate normally on the network and may perform the required testing sequence or sequences in the background.

In another embodiment of the present invention, the probes are wireless and may be configured to intercept packet data from a pass-through point using infrared, WIFI™, Bluetooth™ technology or other wireless access technologies.

The methods and apparatus of the present invention may be provided with a portion or all of the components illustrated in the various embodiments of this specification without departing from the spirit and scope of the present invention. The spirit and scope of the present invention is limited only by the following claims.

What is claimed is:

1. A system for testing a segment of a data-packet-network comprising:
    a first probe connected substantially at one end of the segment;
    a second probe connected substantially at the opposite end of the segment from the location of the first probe; and
    a process application distributed to each probe;
    characterized in that the probes form a direct data path for bidirectional packet exchange from one end of the segment to the opposite end of the segment having two data exchange points on the segment and the first and second probes at said ends collect data from and time stamp data packets as they pass forming first and second records of the individual packets at the probes whereupon the second-formed records of each packet are compared with the first records of each packet at the probes for record matching, time-stamp comparison and test result processing.

2. The system of claim 1 wherein the data-packet-network supports one or both of a transport control protocol and of a real-time transport protocol-capable network.

3. The system of claim 1 wherein the data-packet-network is the Internet network.

4. The system of claim 1 wherein the data-packet-network is an Ethernet network.

5. The system of claim 1 wherein probes are one or a combination of desktop computers, network routers or network servers having permanent or temporary access to the data packet network.

6. The system of claim 1 wherein, the probes are dedicated units programmed for line testing.

7. The system of claim 1 wherein, the probes are software components distributed to selected end nodes.

8. The system of claim 1 wherein, the probes are firmware components distrusted to selected end nodes.

9. The system of claim 8 wherein the firmware components include instructions for performing a testing sequence.

10. The system of claim 1 wherein the result processing produces an average latency value for the segment.

11. The system of claim 1 wherein the result processing produces an average jitter value for the segment.

12. The system of claim 1 wherein the result processing produces an average packet-loss ratio value of the segment.

13. The system of claim 1 wherein the result processing produces an average data throughput value of the segment.

14. The system of claim 1 wherein the segment defines a network line between two end nodes.

15. The system of claim 1 wherein the segment defines an MPLS tunnel.

16. The system of claim 1 wherein the segment defines a network line wherein the probes are not the final destination for the packets, but test a segment of the network line between two nodes in the network.

17. A method for testing a segment of a data-packet-network comprising:
   (a) establishing a probe at one end of the segment and a probe at the opposite end of the segment the probes forming a direct data path for bidirectional packet exchange between the one end of the segment to the opposite end of the segment and;
   (b) capturing data from data packets traveling the length of the segment one time at each probe of the pair of probes;
   (c) recording the captured data at the probes and time-stamping each record formed;
   (d) sharing records formed by one probe with the other probe, the records shared by either probe in the record forming sequence;
   (e) matching the shared records each probe;
   (f) comparing the time-stamp information of the matching records; and
   (g) processing the comparison results for the aggregate of matches to produce resulting test values for the segment tested.

18. The method of claim 17 wherein the data-packet-network supports one or both of transport control protocol and real-time transport protocol.

19. The method of claim 17 wherein the data-packet-network is one of an IP network or an Ethernet network.

20. The method of claim 17 wherein in step (a) the probes are one or a combination of desktop computers, network routers, network severs having permanent or temporary access to the data packet network.

21. The method of claim 17 wherein in step (a) the probes are dedicated units programmed for line testing.

22. The method of claim 17 wherein in step (a) the probes are software components distributed to selected end nodes.

23. The method of claim 17 wherein in step (a) the probes are firmware components distributed to selected end nodes.

24. The method of claim 17 wherein in step (b) the data captured includes source ID, destination ID, and sequence number of each packet selected for data capture.

25. The method of claim 17 wherein in step (c) the records are stored in a data cache maintained by each probe.

26. The method of claim 17 wherein in step (d) the records are shared via a control plane link between the probes.

27. The method of claim 17 wherein in step (e) the records are matched according to the unique set of source ID, destination ID and sequence number.

28. The method of claim 17 wherein in step (f) a latency value is produced as a result value for each matching record having two timestamps to compare.

29. The method of claim 17 wherein in step (g) the aggregate defines all of the records currently held in storage the results valid for the period of testing.

* * * * *

UNITED STATES PATENT AND TRADEMARK OFFICE
CERTIFICATE OF CORRECTION

| | |
|---|---|
| PATENT NO. | : 7,961,637 B2 |
| APPLICATION NO. | : 10/862959 |
| DATED | : June 14, 2011 |
| INVENTOR(S) | : Tom McBeath |

It is certified that error appears in the above-identified patent and that said Letters Patent is hereby corrected as shown below:

**At column 10 claim no. 1 line nos. 33-50 make the following amendments:

1. A system for testing a segment of a data-packet-network comprising:

a first probe connected substantially at one end of the segment;

a second probe connected substantially at the opposite end of the segment from the location of the first probe; and a process application distributed to each probe;

characterized in that ~~the probes form a direct data path for bidirectional packet exchange from one end of the segment to the opposite end of the segment having two data exchange points on the segment and~~ the first and second probes at said ends collect data from <u>selected</u> ~~and time-stamp~~ data packets as they pass <u>and generate a time stamp for each selected data packet, thereby</u> forming first and second records of ~~the individual~~ <u>each selected data</u> packet[[s]] at the <u>first and second</u> probes whereupon the second ~~formed~~ record[[s]] of each <u>selected</u> packet <u>is</u> [[are]] compared with the first record[[s]] of each <u>selected</u> packet ~~at the probes~~ for record matching, time [[-]] stamp comparison and test result processing.**

**At claim no. 17 column 11 line nos. 19-35 through column 12 line nos. 1-3 make the following amendments:

17. A method for testing a segment of a data-packet-network comprising:

(a) establishing a <u>first</u> probe at one end of the segment and a <u>second</u> probe at the opposite end of the segment ~~the probes forming a direct data path for bidirectional packet exchange between the one end of the segment to the opposite end of the segment and~~;

(b) capturing data from <u>selected</u> data packets ~~traveling the length of the segment one time~~ at each of <u>the first and second</u> probes;

Signed and Sealed this
Eighteenth Day of October, 2011

David J. Kappos
*Director of the United States Patent and Trademark Office*

CERTIFICATE OF CORRECTION (continued)
U.S. Pat. No. 7,961,637 B2

(c) recording the captured data at the probes and <u>generating a time stamp for</u> ~~time stamping~~ each record formed;

(d) sharing <u>the</u> records ~~formed by one probe with the other probe, the records shared by either probe in the record forming sequence~~;

(e) matching the shared records <u>based on the captured data</u> ~~each probe~~;

(f) comparing the time [[-]] stamp<u>s</u> ~~information~~ of the matching records; and (g) processing the comparison results ~~for the aggregate of matches~~ to produce resulting test values for the segment tested.**